United States Patent
Nishimura et al.

(10) Patent No.: US 12,305,573 B2
(45) Date of Patent: May 20, 2025

(54) GAS TURBINE ENGINE EXHAUST DIFFUSER HAVING MULTIPLE INCLINED SURFACES AT DIFFERENT ANGLES

(71) Applicant: MITSUBISHI HEAVY INDUSTRIES, LTD., Tokyo (JP)

(72) Inventors: Kazuya Nishimura, Tokyo (JP); Takashi Hiyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/240,655

(22) Filed: Aug. 31, 2023

(65) Prior Publication Data

US 2023/0408090 A1 Dec. 21, 2023

Related U.S. Application Data

(63) Continuation of application No. PCT/JP2022/005097, filed on Feb. 9, 2022.

(30) Foreign Application Priority Data

Mar. 24, 2021 (JP) ................................. 2021-050511

(51) Int. Cl.
*F02C 7/00* (2006.01)
*F02C 3/04* (2006.01)
*F23R 3/02* (2006.01)

(52) U.S. Cl.
CPC .................. *F02C 7/00* (2013.01); *F02C 3/04* (2013.01); *F23R 3/02* (2013.01)

(58) Field of Classification Search
CPC .... F02C 7/00; F02C 3/04; F01D 25/24; F01D 25/30; F01D 5/141; F01D 5/143
See application file for complete search history.

(56) References Cited

U.S. PATENT DOCUMENTS 10,422,344 B1 * 9/2019 Grabowska ........... F04D 29/441
10,704,423 B2 * 7/2020 Nanda ..................... F01D 25/30
(Continued)

FOREIGN PATENT DOCUMENTS

DE    10 2011 052 672    3/2012
DE    11 2013 005 501    8/2015
(Continued)

OTHER PUBLICATIONS

International Search Report issued Apr. 5, 2022 in corresponding International Application No. PCT/JP2022/005097, with English translation.
(Continued)

*Primary Examiner* — William H Rodriguez
(74) *Attorney, Agent, or Firm* — Wenderoth, Lind & Ponack, L.L.P.

(57) ABSTRACT

A gas turbine includes a turbine rotor, a turbine, and a diffuser defining an exhaust gas flow path. The diffuser has an inner cylinder, an outer cylinder defining the exhaust gas flow path between the outer cylinder and the inner cylinder, and a strut which connects the inner cylinder and the outer cylinder in a radial direction. The outer cylinder has an inclined surface extending outward in the radial direction from an inlet of the exhaust gas flow path toward an outlet of the exhaust gas flow path in an axial direction. The inclined surface defines an angle of 16° to 24° with an axis of the turbine rotor.

10 Claims, 6 Drawing Sheets

(56) References Cited

U.S. PATENT DOCUMENTS

| | | |
|---|---|---|
| 2010/0226767 A1 | 9/2010 | Becker et al. |
| 2012/0034064 A1* | 2/2012 | Nanda ................... F01D 25/30 |
| | | 415/206 |
| 2012/0042654 A1 | 2/2012 | Siden et al. |
| 2012/0102956 A1* | 5/2012 | Nanda ................... F01D 25/30 |
| | | 60/722 |
| 2013/0121806 A1* | 5/2013 | Beeck ................... F01D 25/30 |
| | | 415/207 |
| 2014/0041395 A1 | 2/2014 | Kitagawa et al. |
| 2014/0137533 A1* | 5/2014 | Subramaniyan ........ F01D 25/30 |
| | | 60/39.5 |
| 2015/0143810 A1* | 5/2015 | Salunkhe .............. F01D 11/001 |
| | | 415/108 |
| 2015/0143813 A1* | 5/2015 | Salunkhe .............. F01D 25/162 |
| | | 415/108 |
| 2015/0143814 A1* | 5/2015 | Orosa ................... F01D 25/30 |
| | | 29/888.012 |
| 2015/0143815 A1* | 5/2015 | Salunkhe ................ F01D 25/30 |
| | | 415/108 |
| 2015/0143816 A1 | 5/2015 | Salunkhe et al. |
| 2017/0130596 A1* | 5/2017 | Bhaumik ................ F01D 5/143 |
| 2018/0202319 A1* | 7/2018 | Nanda .................... F01D 5/141 |
| 2019/0170010 A1* | 6/2019 | Stein .................... F01D 17/143 |
| 2020/0217225 A1* | 7/2020 | Senn ...................... F01D 25/30 |
| 2023/0030721 A1* | 2/2023 | Siorek .................... F01D 25/30 |
| 2023/0279778 A1* | 9/2023 | John ........................ F01D 9/04 |
| | | 415/208.1 |

FOREIGN PATENT DOCUMENTS

| | | |
|---|---|---|
| EP | 2 692 987 | 1/2021 |
| JP | 8-218803 | 8/1996 |
| JP | 2011-169172 | 9/2011 |
| JP | 2012-36891 | 2/2012 |
| JP | 2012-41925 | 3/2012 |
| JP | 2012-92837 | 5/2012 |
| JP | 2012-207648 | 10/2012 |
| JP | 5812567 | 11/2015 |
| JP | 2015-536410 | 12/2015 |
| JP | 6018368 | 10/2016 |
| JP | 2017-227147 | 12/2017 |
| WO | 2014/078370 | 5/2014 |
| WO | 2017/221971 | 12/2017 |

OTHER PUBLICATIONS

Written Opinion of the International Searching Authority issued Apr. 5, 2022 in corresponding International Application No. PCT/JP2022/005097, with English translation.

* cited by examiner

GAS TURBINE ENGINE EXHAUST DIFFUSER HAVING MULTIPLE INCLINED SURFACES AT DIFFERENT ANGLES

CROSS-REFERENCE TO RELATED APPLICATIONS

This application claims priority from Japanese Patent Application No. 2021-050511 filed on Mar. 24, 2021, the contents of which are incorporated herein by reference. This application is a continuation application based on PCT Application No. PCT/JP2022/005097 whose priority is claimed from Japanese Patent Application No. 2021-050511. The contents of the PCT Application are incorporated herein by reference.

TECHNICAL FIELD

The present disclosure relates to a turbine and a gas turbine.

BACKGROUND ART

Mainly, a gas turbine includes a compressor that generates compressed air, a combustor that mixes the compressed air and fuel with each other and that performs combustion so that a high-temperature and high-pressure combustion gas is generated, a turbine that is driven by means of the combustion gas, and a tubular diffuser that guides an exhaust gas from the turbine. As described in Japanese Patent No. 6018368, the diffuser includes an inner cylinder that extends along an axis of the gas turbine, an outer cylinder that is provided on an outer peripheral side of the inner cylinder such that an exhaust gas flow path is formed between the inner cylinder and the outer cylinder, and a strut that connects the inner cylinder and the outer cylinder to each other. In the case of the diffuser described in Japanese Patent No. 6018368, the diameter of the outer cylinder gradually increases toward a downstream side. That is, an inner peripheral surface of the outer cylinder is inclined with respect to the axis in a cross-sectional view including the axis. Accordingly, the velocity of an exhaust gas stream from the turbine is reduced while the exhaust gas stream is passing through the diffuser so that the static pressure is recovered.

Here, it is a known fact that a pressure loss of the exhaust gas stream occurs when the exhaust gas flows in the diffuser. Mainly, the pressure loss is caused because the strut is exposed to the exhaust gas stream. In order to suppress the pressure loss at the strut and to improve the performance of the diffuser, it is important to reduce the flow velocity of the exhaust gas at a position upstream of the strut. Therefore, it is necessary to make the angle of inclination of the inner peripheral surface of the outer cylinder as large as possible.

SUMMARY OF INVENTION

Technical Problem

However, in a case where the angle of inclination of the inner peripheral surface of the outer cylinder is made excessively large, the stream may not be able to follow the inner peripheral surface, and separation of the stream may cause a vortex to be generated. In a case where a vortex is generated, the aerodynamic performance of the diffuser is impaired. As a result, the performance of the turbine may be affected.

The present disclosure has been made to solve the above-described problem, and an object thereof is to provide a turbine and a gas turbine with further improved performance attributable to reduction in pressure loss.

Solution to Problem

According to an aspect of the present disclosure for solving the above-described problem, there is provided a turbine including: a turbine rotor that extends along an axis and that is rotatable around the axis; a turbine casing that covers the turbine rotor from an outer peripheral side; a plurality of turbine rotor vane rows that are arranged in a direction along the axis, the turbine rotor vane rows including a plurality of turbine rotor vanes that are arranged on an outer peripheral surface of the turbine rotor in a circumferential direction around the axis; a plurality of turbine stator vane rows that are arranged in the direction along the axis, the turbine stator vane rows including a plurality of turbine stator vanes that are provided on an inner peripheral surface of the turbine casing to be adjacent to the turbine rotor vanes while being on one side in the direction along the axis and that are arranged in the circumferential direction; and a diffuser in which an exhaust gas flow path through which an exhaust gas flows from the one side to the other side in the direction along the axis is formed, the diffuser being provided closer to the other side in the direction along the axis than a last stage rotor vane row that is closest to the other side in the direction along the axis among the plurality of turbine rotor vane rows. The diffuser includes an inner cylinder that extends along the axis, an outer cylinder that covers the inner cylinder from the outer peripheral side and that forms the exhaust gas flow path between the inner cylinder and the outer cylinder, and a plurality of struts that are provided at intermediate positions in the exhaust gas flow path, that connect the inner cylinder and the outer cylinder to each other in a radial direction, and that are arranged in the circumferential direction, the outer cylinder includes a first inclined surface that extends from an inner side in the radial direction centered on the axis to become closer to an outer side from an inlet of the exhaust gas flow path on the one side in the direction along the axis toward the other side, the first inclined surface forms an angle equal to or larger than 16° and equal to or smaller than 24° with respect to the axis in a cross-sectional view including the axis, and a throat width at end portions of the turbine rotor vanes of the last stage rotor vane row that are on the outer side in the radial direction with respect to the axis is set to be larger than a throat width at an intermediate portion in the radial direction.

Advantageous Effects of Invention

According to the present disclosure, it is possible to provide a turbine and a gas turbine with further improved performance attributable to reduction in pressure loss.

DESCRIPTION OF EMBODIMENTS (Configuration of Gas Turbine)

Hereinafter, a gas turbine 10 according to an embodiment of the present disclosure will be described with reference to FIGS. 1 to 7.

Figure 1:
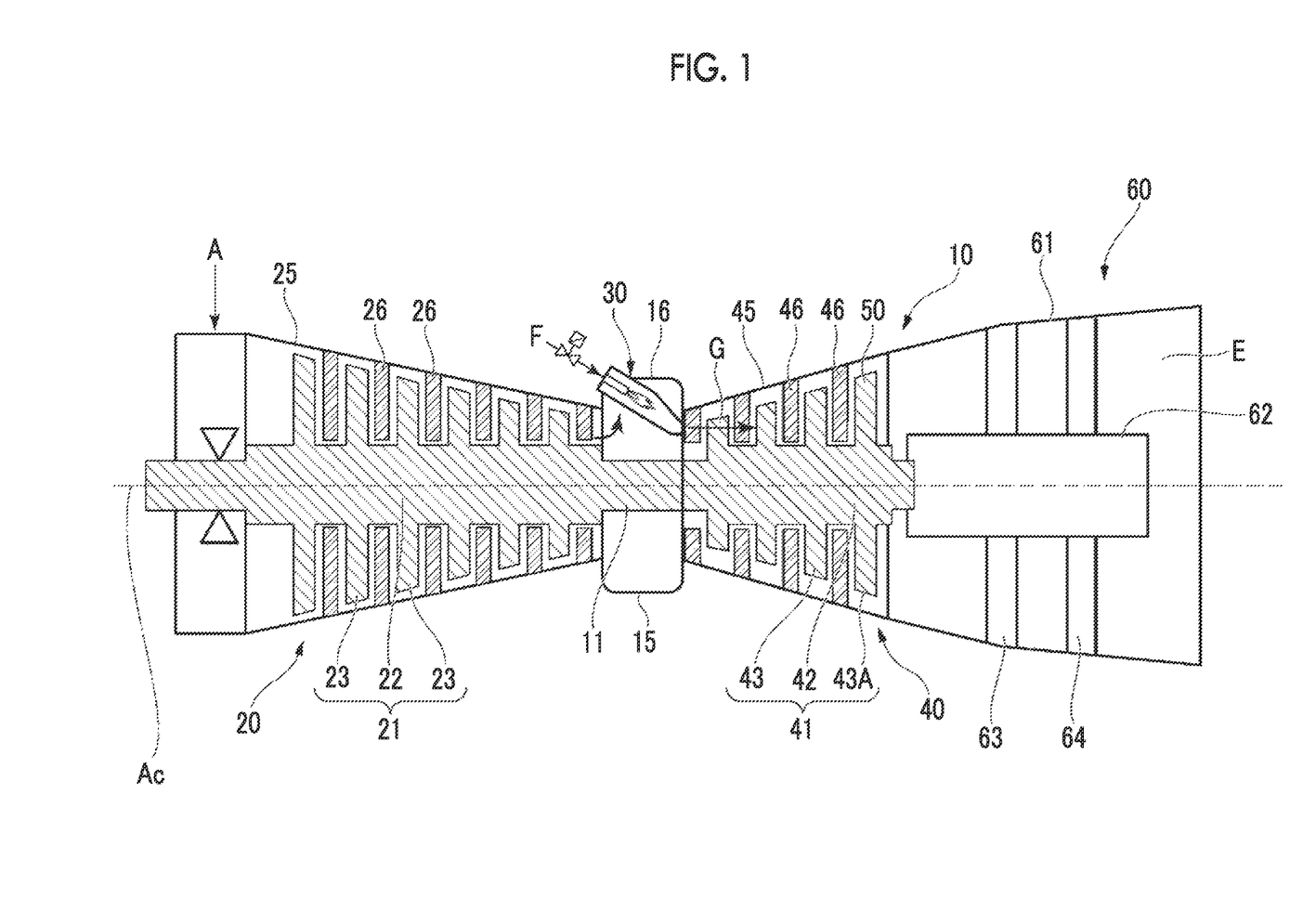
FIG. 1 is a cross-sectional view showing a schematic configuration of a gas turbine according to an embodiment of the present disclosure.

As shown in FIG. 1, the gas turbine 10 includes a compressor 20, a combustor 30, a turbine 40, and a diffuser 60. The compressor 20 compresses air A taken in from the outside so that high-pressure compressed air is generated. The combustor 30 generates a high-temperature and high-pressure combustion gas G by mixing the compressed air and fuel F with each other and burning the mixture thereof. The turbine 40 is rotationally driven by the combustion gas G.

The compressor 20 includes a compressor rotor 21, a compressor casing 25, and a plurality of compressor stator vane rows 26. The compressor rotor 21 includes a compressor rotary shaft 22 and a plurality of compressor rotor vane rows 23. The compressor rotary shaft 22 extends along an axis Ac and is rotatable around the axis Ac. The plurality of compressor rotor vane rows 23 are arranged along an outer peripheral surface of the compressor rotary shaft 22 at intervals in a direction along the axis Ac. Although not shown in detail, each of the compressor rotor vane rows 23 includes a plurality of compressor rotor vanes arranged in a circumferential direction along the outer peripheral surface of the compressor rotary shaft 22.

The compressor casing 25 has a tubular shape that covers the compressor rotor 21 from an outer peripheral side thereof. The plurality of compressor stator vane rows 26 arranged in the direction along the axis Ac are provided on an inner peripheral surface of the compressor rotor 21. The compressor rotor vane rows 23 and the compressor stator vane rows 26 are alternately arranged in the direction along the axis Ac. More specifically, one compressor stator vane row 26 is provided on one side with respect to one compressor rotor vane row 23 in the direction along the axis Ac.

An intermediate casing 16 is connected to the other side of the compressor casing 25 in the direction along the axis Ac. The combustor 30 is disposed in the intermediate casing 14.

The turbine 40 includes a turbine rotor 41, a turbine casing 45, and a plurality of turbine stator vane rows 46. The turbine rotor 41 includes a turbine rotary shaft 42 and a plurality of turbine rotor vane rows 43. The turbine rotary shaft 42 extends along the axis Ac and is rotatable around the axis Ac. The plurality of turbine rotor vane rows 43 are arranged along an outer peripheral surface of the turbine rotary shaft 42 at intervals in the direction along the axis Ac. Although not shown in detail, each of the turbine rotor vane rows 43 includes a plurality of turbine rotor vanes arranged in the circumferential direction along the outer peripheral surface of the turbine rotary shaft 42. Note that the turbine rotor vane row 43 that is closest to the other side in the direction along the axis Ac among the plurality of turbine rotor vane rows 43 arranged in the direction along the axis Ac is a last stage rotor vane row 43A. In addition, in the following description, turbine rotor vanes that the last stage rotor vane row 43A includes will be referred to as a last stage rotor vane row 50.

The compressor rotor 21 and the turbine rotor 41 described above are coaxially connected to each other along the axis Ac to form a gas turbine rotor 11. The compressor casing 25, the intermediate casing 16, and the turbine casing 45 are coaxially connected to each other along the axis Ac to form a gas turbine casing 15. The gas turbine rotor 11 can integrally rotate around the axis Ac inside the gas turbine casing 15. Note that in the following description, a side on which the compressor 20 is positioned (that is, the one side in the direction along the axis Ac) as seen from the turbine 40 may be simply referred to as an "upstream side", and a side opposite thereto (that is, the other side in the direction along the axis Ac) may be simply referred to as a "downstream side".

The diffuser 60 is provided to reduce the flow velocity of an exhaust gas discharged from the turbine 40 (exhaust gas) for the purpose of static pressure recovery. The diffuser 60 is connected to a downstream side of the turbine casing 45. The diffuser 60 includes an inner cylinder 62, an outer cylinder 61, a plurality of struts 63, and a plurality of manholes 64. The inner cylinder 62 extends along the axis Ac. A bearing device 80 (which will be described later) for rotatably supporting the gas turbine rotor 11 is accommodated in the inner cylinder 62. In the present embodiment, for example, the outer diameter of the inner cylinder 62 is constant over a range from an upstream side to a downstream side. Note that a configuration in which the outer diameter of the inner cylinder 62 gradually decreases from the upstream side toward the downstream side can also be adopted.

The outer cylinder 61 has a tubular shape that covers the inner cylinder 62 from an outer peripheral side thereof. A space between the outer cylinder 61 and the inner cylinder 62 is an exhaust gas flow path E through which an exhaust gas discharged from the turbine 40 flows. The inner diameter of the outer cylinder 61 gradually increases from the upstream side toward the downstream side. Therefore, the flow path cross-sectional area of the exhaust gas flow path E gradually increases toward the downstream side.

The outer cylinder 61 and the inner cylinder 62 are connected to each other in a radial direction by the struts 63. That is, the struts 63 support, with respect to the inner cylinder 62, the outer cylinder 61 from an inner side in the radial direction. The struts 63 are provided at intermediate positions in the exhaust gas flow path E in the direction along the axis Ac. Disposition of the struts 63 will be described in detail later. The plurality of struts 63 are arranged at intervals in the circumferential direction. Each of the struts 63 radially extends over a space between an inner peripheral surface of the outer cylinder 61 and an outer peripheral surface of the inner cylinder 62. In addition, although not shown in detail, it is desirable that each strut 63 has a streamlined cross-sectional shape from the upstream side to the downstream side as seen in the radial direction.

The manholes 64 are provided downstream of the struts 63 at intervals in the direction along the axis Ac. The manholes 64 radially extend over a space between the outer cylinder 61 and the inner cylinder 62. The plurality of manholes 64 are arranged at intervals in the circumferential direction. Various kinds of pipes and wires are accommodated in the manholes 64.

(Detailed Configuration of Last Stage Rotor Vane Row and Diffuser)

Figure 2:
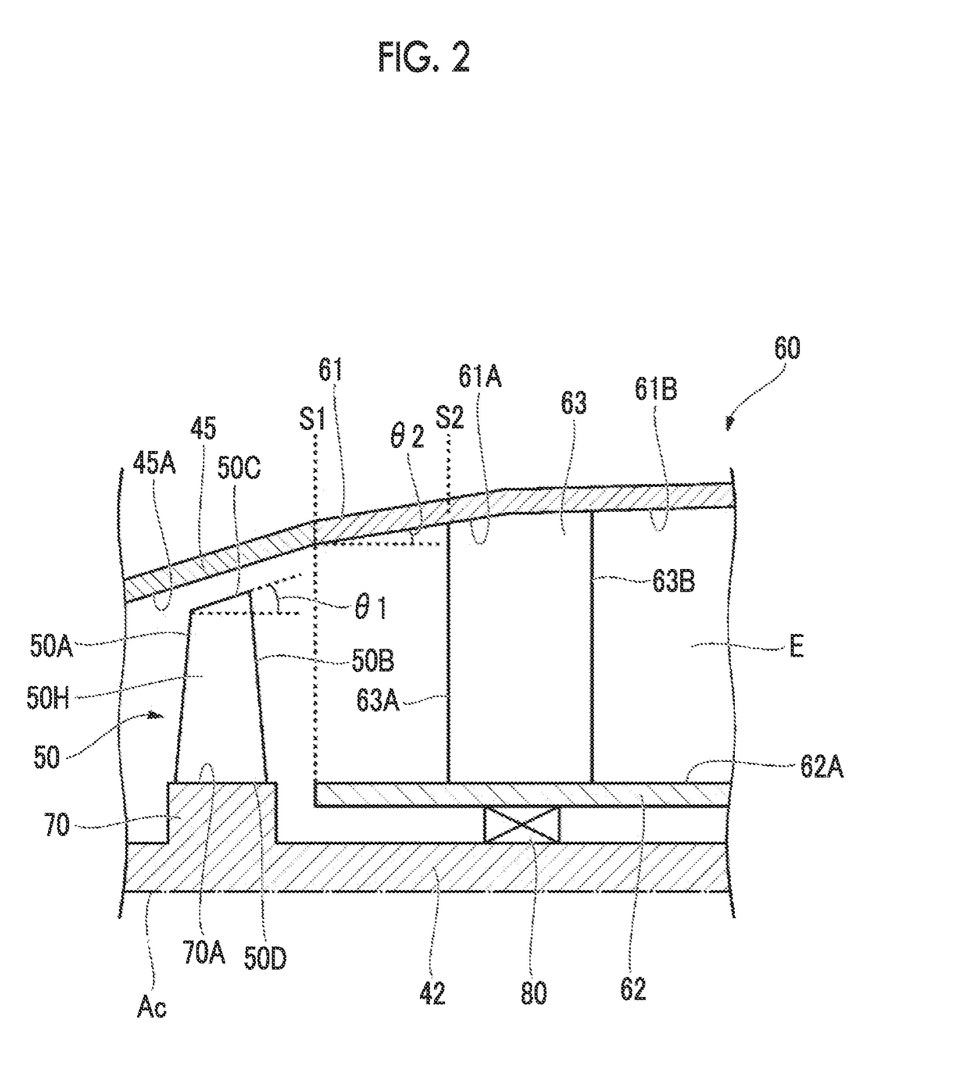
FIG. 2 is an enlarged cross-sectional view of a main portion of the gas turbine according to the embodiment of the present disclosure.

Next, a detailed configuration of the last stage rotor vane row 50 and the diffuser 60 will be described with reference to FIG. 2. As shown in the drawing, the last stage rotor vane row 50 includes a disk 70 and rotor vane bodies 50H. The disk 70 is attached to the turbine rotary shaft 42. The disk 70 has a disk-like shape centered on the axis Ac. The rotor vane bodies 50H are provided on an outer peripheral surface 70A of the disk 70. The rotor vane bodies 50 extend radially outward from the outer peripheral surface 70A.

As described in detail later, each rotor vane body 50H has a vane-like cross-sectional shape as seen in the radial direction. Edges of the rotor vane bodies 50H that face the upstream side are leading edges 50A. Edges of the rotor vane bodies 50H that face the downstream side are trailing edges 50B. End surfaces of the rotor vane bodies 50H that face an outer side in the radial direction are tip side end surfaces 50C. The tip side end surfaces 50C extend from the inner side in the radial direction to become closer to an outer side from the upstream side toward the downstream side. That is, the tip side end surfaces 50C are inclined with respect to the axis Ac at an angle $\theta1$ as seen in a cross-sectional view including the axis Ac. The angle $\theta1$ is appropriately set within a range of an angle equal to or larger than 20° to an angle equal to or smaller than 25°. The tip side end surfaces 50C face art inner peripheral surface 45A of the turbine casing 45 with an interval provided therebetween in the radial direction. The inner diameter of the inner peripheral surface 45A gradually increases from the upstream side toward the downstream side.

Furthermore, radial inner end portions of the rotor vane bodies 50H are hub side end surfaces 50D. The hub side end surfaces 50D abut against the outer peripheral surface 70A of the disk 70. Although not shown in detail, vane roots with serration-like undulating portions are formed on radial inner sides of the hub side end surfaces 50D. A groove corresponding to such an undulating shape is formed on the disk 70. The undulating shape formed at the vane root and an inner surface of the groove engage with each other so that the rotor vane bodies 50H are supported to be prevented from falling off.

The inner cylinder 62 of the diffuser 60 covers a shaft end of the turbine rotary shaft 42 from an outer peripheral side. The bearing device 80 is provided inside the inner cylinder 62. The bearing device 80 rotatably supports the turbine rotary shaft 42. Specific examples of the bearing device 80 provided at this position include a journal bearing. The journal bearing supports a radial load caused by the turbine rotary shaft 42. A surface of the inner cylinder 62 that faces the outer peripheral side is an outer peripheral surface 62A. The outer peripheral surface 62A is at the same position as the outer peripheral surface 70A of the disk 70 in the radial direction. Note that being "the same" means being substantially the same, and design tolerances and manufacturing errors are allowed.

An inner peripheral surface of the outer cylinder 61 is formed by a first inclined surface 61A and a second inclined surface 61B. The first inclined surface 61A is connected to a downstream side of the inner peripheral surface 45A of the turbine casing 45. The first inclined surface 61A extends from the inner side in the radial direction to become closer to the outer side from the upstream side toward the downstream side. That is, the first inclined surface 61A is inclined with respect to the axis Ac at an angle $\theta2$ as seen in the cross-sectional view including the axis Ac. The angle $\theta2$ is appropriately set within a range of an angle equal to or larger than 16° to an angle equal to or smaller than 24°. Therefore, a difference between the angle $\theta1$ formed between the tip side end surfaces 50C of the rotor vane bodies 50H and the axis Ac and the angle $\theta2$ formed between the first inclined surface 61A and the axis Ac falls within a range of an angle equal to or larger than 0° and an angle equal to or smaller than 5°.

The second inclined surface 61B is connected to a downstream side of the first inclined surface 61A. As with the first inclined surface 61A, the second inclined surface 61B extends from the inner side in the radial direction to become closer to the outer side from the upstream side toward the downstream side. That is, the second inclined surface 61B is inclined with respect to the axis Ac. An angle formed between the second inclined surface 61B and the axis Ac is smaller than the angle $\theta2$ formed between the first inclined surface 61A and the axis Ac. More specifically, it is desirable that the angle is about 8°.

Upstream side edges of the struts 63 described above are strut leading edges 63A, and downstream side end edges of the struts 63 are strut trailing edges 63B. The strut leading edges 63A are positioned on the first inclined surface 61A. Meanwhile, the strut trailing edges 63B are positioned on the second inclined surface 61B. That is, the struts 63 are disposed over the first inclined surface 61A and the second inclined surface 61B in the direction along the axis Ac.

Here, the cross-sectional area (the cross-sectional area as seen in the direction along the axis Ac) of the exhaust gas flow path E at an inlet (an end portion on the upstream side) of the diffuser 60 will be given a reference numeral "S1". Furthermore, the cross-sectional area (the cross-sectional area as seen in the direction along the axis Ac) of the exhaust gas flow path E at the strut leading edges 63A will be given a reference numeral "S2". That is, the cross-sectional areas S1 and S2 refer to the areas of annular regions surrounded by the outer peripheral surface 62A of the inner cylinder 62 and by the inner peripheral surface (the first inclined surface 61A) of the outer cylinder 61. At this time, it is desirable that the ratio (the area ratio) between the cross-sectional area S1 and the cross-sectional area S2 is in a range of a value equal to or larger than 1.25 to a value equal to or smaller than 1.40. It is more desirable that the area ratio is in a range of a value equal to or larger than 1.28 to a value equal to or smaller than 1.37. It is most desirable that the area ratio is 1.30. Note that when realizing the above-described ratio between the cross-sectional areas, it is not necessary to consider reduction in area caused by a fillet portion formed at an attachment portion of the struts 63.

(Further Detailed Configuration of Last Stage Rotor Vane Row)

Figure 3:
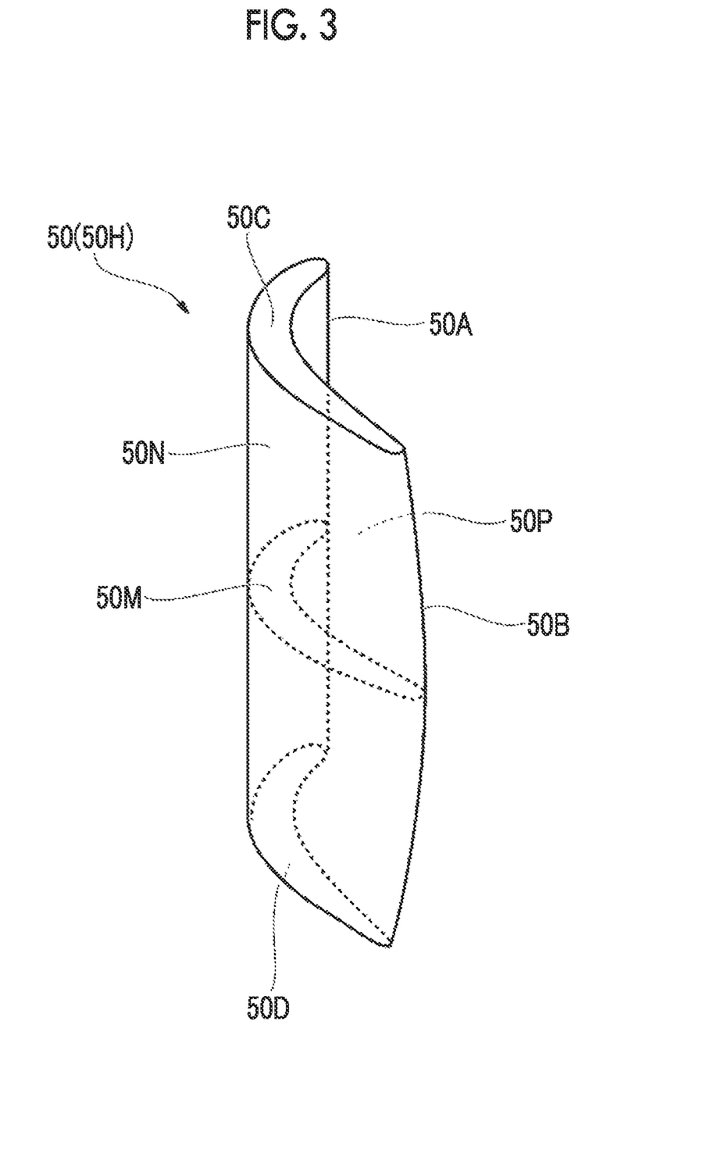
FIG. 3 is a perspective view showing a configuration of a last stage rotor vane row according to the embodiment of the present disclosure.

Next, a further detailed configuration of the last stage rotor vane row 50 (the rotor vane bodies 50H) will be described with reference to FIGS. 3 to 6. As shown in FIG. 3, each rotor vane body 50H has a vane-like cross-sectional shape as seen in the radial direction. That is, the rotor vane body 50H is curved to become closer to one side in the circumferential direction from the leading edge 50A toward the trailing edge 50B. A surface of the rotor vane body 50H that faces the one side in the circumferential direction (that is, a surface that faces a rear side in a rotation direction of the turbine rotary shaft 42) is a pressure surface 50P. The pressure surface 50P is curvedly concave toward the one side in the circumferential direction. A surface of the rotor vane body 50H that faces the other side in the circumferential direction (that is, a surface that faces a front side in the rotation direction of the turbine rotary shaft 42) is a suction surface 50N. The suction surface 50N is curvedly convex toward the other side in the circumferential direction.

Figure 4:
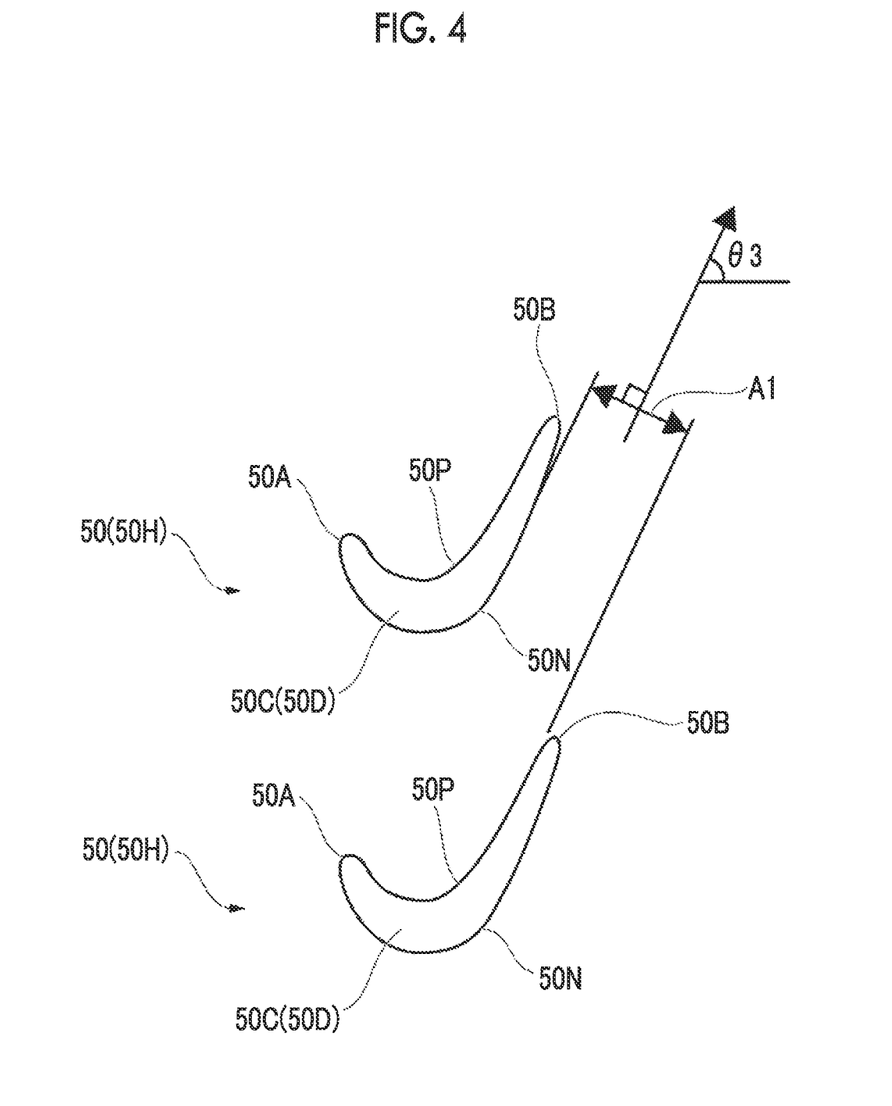
FIG. 4 is a view showing the last stage rotor vane row according to the embodiment of the present disclosure as seen in a radial direction and is an explanatory view showing a throat width and an outflow angle at an end portion on a tip side and at an end portion on a hub side.
Figure 5:
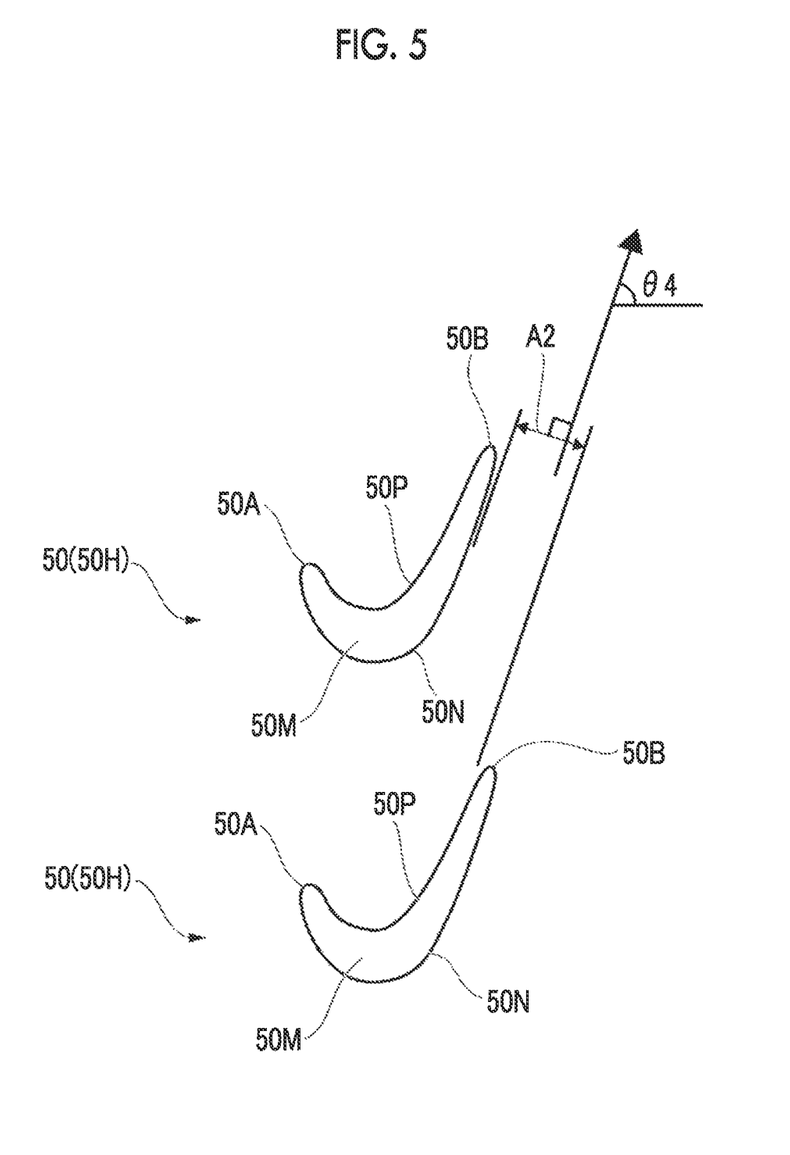
FIG. 5 is a view showing the last stage rotor vane row according to the embodiment of the present disclosure as seen in the radial direction and is an explanatory view showing a throat width and an outflow angle at an intermediate portion.

Furthermore, regarding the rotor vane body 50H, a cross-sectional shape at the tip side end surface 50C, a cross-sectional shape at the hub side end surface 50D, and a cross-sectional shape at an intermediate position (an intermediate portion 50M) in the radial direction are different from each other. Here, as shown in FIG. 4, a throat width at the tip side end surface 50C and at the hub side end surface 50D will be given a reference numeral "A1". In addition, an outflow angle at the tip side end surface 50C and at the hub side end surface 50D will be given a reference numeral "θ3". Furthermore, as shown in FIG. 5, a throat width at the intermediate portion 50M will be given a reference numeral "A2". In addition, an outflow angle at the intermediate portion 50M will be given a reference numeral "θ4".

At this time, as shown in the drawings, the throat width A1 at the tip side end surface 50C and at the hub side end surface 50D is set to be larger than the throat width A2 at the intermediate portion 50M. Note that the throat width referred to here means the width of a flow path at a position (a throat position) at which a distance between a pair of rotor vane bodies 50H adjacent to each other in the circumferential direction is smallest. The throat width gradually decreases from the tip side end surface 50C toward the intermediate portion 50M, and the throat width gradually increases from the intermediate portion 50M toward the hub side end surface 50D.

Furthermore, the outflow angle θ3 at the tip side end surface 50C and at the hub side end surface 50D is set to be smaller than the outflow angle θ4 at the intermediate portion 50M. The outflow angle referred to here means an angle formed between the axis Ac and a stream passing through a space between a pair of rotor vane bodies 50H adjacent to each other. The outflow angle gradually increases from the tip side end surface 50C toward the intermediate portion 50M and gradually decreases from the intermediate portion 50M toward the hub side end surface 50D.

Figure 6:
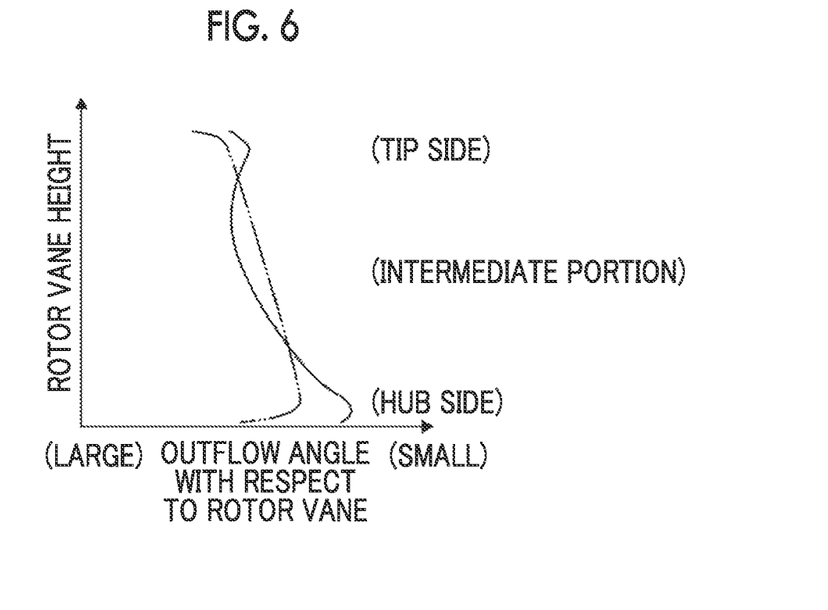
FIG. 6 is a graph showing an outflow angle with respect to a rotor vane in a height direction of the last stage rotor vane row.
Figure 7:
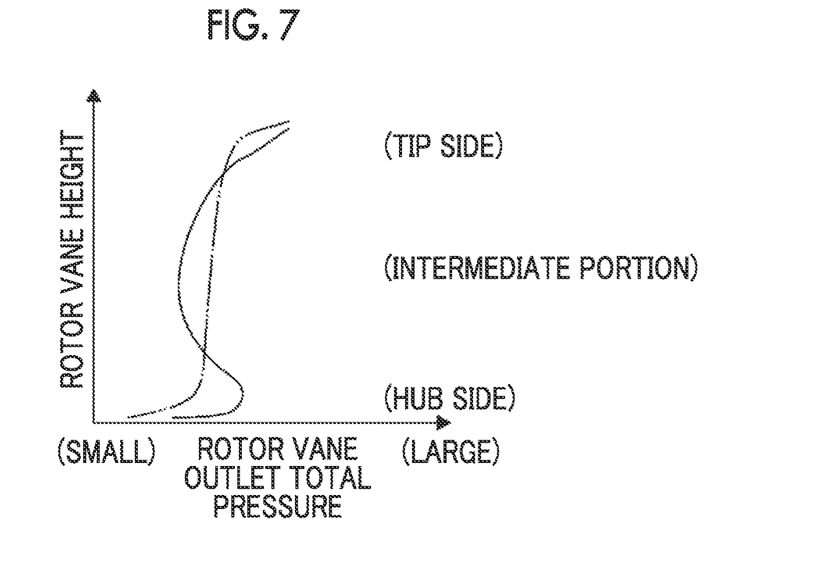
FIG. 7 is a graph showing the absolute total outlet pressure of the last stage rotor vane row in the height direction of the last stage rotor vane row.

As represented by a two-dot chain line in FIG. 6, in the case of a rotor vane in the related art, an outflow angle is set to gradually decrease from a tip side toward a hub side. On the other hand, in the case of the rotor vane body 50H according to the present embodiment, as represented by a solid line, the outflow angle is set to gradually increase from the tip side toward the hub side and then gradually decrease toward the hub side. As described above, in the case of the rotor vane body 50H, the outflow angle on the tip side and on the hub side is smaller than that at the intermediate portion 50M. That is, the throat width on the tip side and on the hub side is larger than that at the intermediate portion 50M.

(Operation and Effect)

Next, the operation of the gas turbine 10 according to the present embodiment will be described. In a case where the gas turbine 10 is to be driven, first, a rotational force is applied to the compressor rotor 21 by means of an external driving source. Accordingly, the compressor rotor 21 rotates around the axis Ac, and external air A is taken into the compressor 20. The air A taken into the compressor 20 comes into contact with the compressor stator vane rows 26 and the compressor rotor vane rows 23 while flowing from the upstream side to the downstream side inside the compressor casing 25. The compressor stator vane rows 26 change a direction in which the air A flows so that the angle of inflow to the compressor rotor vane rows 23 on the downstream side is optimized. Furthermore, the air A is pressure-fed by the compressor rotor vane rows 23, so that the pressure thereof is gradually increased and compressed air is generated. The compressed air is guided to the combustor 30 positioned downstream of the compressor 20. In the combustor 30, the compressed air and the fuel F are mixed with each other, the mixture thereof is burned, and thus the combustion gas G is generated. The combustion gas G is guided to the turbine 40 positioned downstream of the combustor 30.

In the turbine 40, the combustion gas G comes into contact with the turbine stator vane rows 46 and the turbine rotor vane rows 43. The turbine stator vane rows 46 change a direction in which the combustion gas G flows so that the angle of inflow to the turbine rotor vane rows 43 on the downstream side is made suitable. Furthermore, when the combustion gas G flows around the turbine rotor vane rows 43, rotational energy is applied to the turbine rotor 41 via the turbine rotor vane rows 43. Accordingly, the gas turbine rotor 11 rotates around the axis Ac. An exhaust gas discharged from the turbine 40 is guided to another device (not shown) on the outside after being subjected to static pressure recovery while flowing through the diffuser 60.

Here, it is a known fact that a pressure loss of an exhaust gas stream occurs when the exhaust gas flows in the diffuser 60. Mainly, the pressure loss is caused because the struts 63 are exposed to the exhaust gas stream. In order to suppress the pressure loss at the struts 63 and to improve the performance of the diffuser 60, it is important to reduce the flow velocity of the exhaust gas at a position upstream of the struts 63. Therefore, it is necessary to make the angle of inclination of the inner peripheral surface of the outer cylinder 61 as large as possible.

However, in a case where the angle of inclination of the inner peripheral surface of the outer cylinder 61 is made excessively large, the stream may not be able to follow the inner peripheral surface, and separation of the stream may cause a vortex to be generated. In a case where a vortex is generated, the aerodynamic performance (the amount of static pressure recovery) of the diffuser 60 is impaired. As a result, the performance of the gas turbine 10 may be affected.

Therefore, in the present embodiment, the configuration as described above is adopted. According to the above-described configuration, the angle formed between the axis Ac and the first inclined surface 61A of the outer cylinder 61 is equal to or larger than 16° and equal to or smaller than 24° so as to be larger than that in the case of a diffuser in the related art. Accordingly, the flow velocity of an exhaust gas flowing through the exhaust gas flow path E can be further reduced at a region upstream of the struts 63. As a result, the exhaust gas stream flowing in the vicinity of the struts 63 is less likely to be affected by the struts 63. That is, a pressure loss caused by the struts 63 can be further suppressed.

Furthermore, regarding the last stage rotor vane row 50, the throat width A1 at an end portion on the outer side in the radial direction (the tip side) is larger than the throat width A2 at the intermediate portion 50M. Accordingly, the total pressure at the end portion on the outer side in the radial direction is made high. Therefore, it is possible to reduce a probability that a stream is separated at the first inclined surface 61A.

More specifically, since the throat width on the tip side is larger than that at the intermediate portion 50M, the amount of power acquisition from the combustion gas of the last stage rotor vane row 50 is decreased on the tip side. Meanwhile, since the outflow angle on the intermediate portion 50M side is large (that is, the throat width is small), the amount of power acquisition from the combustion gas is increased at the intermediate portion 50M. Here, as represented by a two-dot chain line in FIG. 7, in the related art, the total pressure of an exhaust gas at an inlet of the diffuser 60 is substantially constant over a range from the tip side to the hub side of the last stage rotor vane row, so that separation of an exhaust gas stream is likely to occur in the vicinity of a wall surface of the outer cylinder 61 or the inner cylinder 62. As a result, there is a possibility that the amount of static pressure recovery in the diffuser 60 is decreased. On the other hand, in the present embodiment, as represented by a solid line in FIG. 7, the total pressure of the exhaust gas at the inlet of the diffuser 60 is higher on the tip side than at the intermediate portion 50M of the rotor vane body 50H. Therefore, the angle θ2 formed between the first inclined surface 61A and the axis Ac can be made larger than that in the related art. Accordingly, separation of an exhaust gas stream in the vicinity of the wall surface of the outer cylinder 61 or the inner cylinder 62 is further suppressed. As a result, the amount of static pressure recovery in the diffuser 60 can be further increased.

Furthermore, according to the above-described configuration, regarding the last stage rotor vane row 50, the throat width A1 at an end portion on the inner side in the radial direction (the hub side) is larger than the throat width A2 at the intermediate portion 50M. Accordingly, the total pressure on the hub side is also made high in addition to the total pressure on the tip side. Therefore, it is possible to reduce a probability that a stream is separated at the outer peripheral surface 62A of the inner cylinder 62. As a result, the amount of static pressure recovery in the diffuser 60 is further increased, and the performance of the gas turbine 10 can be further improved.

In addition, in the above-described configuration, the area ratio between the flow path cross-sectional area (the cross-sectional area S1) of the diffuser at the upstream side edges (the strut leading edges 63A) of the struts 63 and the flow path cross-sectional area (the cross-sectional area S2) at the inlet of the diffuser 60 is equal to or larger than 1.28 and equal to or smaller than 1.37 so as to be larger than that in the case of a gas turbine in the related art. Accordingly, the flow velocity of an exhaust gas can be further reduced at a region upstream of the struts 63.

Furthermore, in the case of the last stage rotor vane row 50, the tip side end surface 50C extends to become closer to the outer side in the radial direction from the upstream side toward the downstream side as seen in the circumferential direction. In addition, the angle θ1 formed between the axis Ac and the tip side end surface 50C is set to be larger than the angle θ2 formed between the axis Ac and the first inclined surface 61A. A stream component of an exhaust gas flowing toward the outer side in the radial direction along the tip side end surface 50C is guided by the first inclined surface 61A positioned on the downstream side. Since the angle θ1 formed between the axis Ac and the tip side end surface 50C is larger than the angle θ2 formed between the axis Ac and the first inclined surface 61A, the above-described stream component comes into close contact with the first inclined surface 61A as if the component is pressed against the first inclined surface 61A from the inner side in the radial direction. As a result, separation of the stream at the first inclined surface 61A can be further suppressed. Accordingly, it is possible to avoid generation of a vortex at the first inclined surface 61A.

In addition, in the above-described configuration, the difference between the angle θ1 formed between the axis Ac and the tip side end surface 50C and the angle θ2 formed between the axis Ac and the first inclined surface 61A is equal to or larger than 0° and equal to or smaller than 5°. Here, as described above, the throat width at the tip side end surface 50C is larger than the throat width at the intermediate portion 50M, and thus, the total pressure of the exhaust gas on the tip side can be maintained high. Accordingly, the difference between the angle θ1 and the angle θ2 can be made smaller than that in the related art. In other words, as long as the angle θ1 is larger than the angle θ2, the angle θ2 formed between the axis Ac and the first inclined surface 61A can be increased to an allowable maximum limit. Accordingly, the separation of the stream at the first inclined surface 61A can be further suppressed.

In addition, in the above-described configuration, the struts 63 are disposed over the first inclined surface 61A and the second inclined surface 61B in the direction along the axis Ac. Accordingly, the exhaust gas stream is sufficiently decelerated in a region on the first inclined surface 61A side before coming into contact with the struts 63. As a result, the pressure loss caused by the struts 63 can be further reduced.

Other Embodiments

The embodiment of the present disclosure has been described above. Note that the above-described configurations can be changed and modified in various ways without departing from the gist of the present disclosure. For example, in the above-described embodiment, an example in which the struts 63 are disposed over the first inclined surface 61A and the second inclined surface 61S of the outer cylinder 61 has been described. However, disposition of the struts 63 is not limited thereto. For example, a configuration in which the struts 63 are disposed only on the second inclined surface 61B can also be adopted. According to such a configuration, since the exhaust gas flows along the first inclined surface 61A, the flow velocity of the exhaust gas can be further reduced at a region upstream of the struts 63. As a result, the pressure loss caused by the struts 63 can be further reduced.

Furthermore, in the above-described embodiment, only the throat width and the outflow angle at the last stage rotor vane row 50 have been described. However, it is also possible to configure a last stage stator vane row provided upstream of the last stage rotor vane row 50 with the same throat width and outflow angle as the last stage rotor vane row 50.

APPENDIX

The turbine 40 and the gas turbine 10 described in each embodiment are understood as follows, for example.

(1) The turbine 40 according to a first aspect includes: the turbine rotor 41 that extends along the axis Ac and that is rotatable around the axis Ac; the turbine casing 45 that covers the turbine rotor 41 from the outer peripheral side; the plurality of turbine rotor vane rows 43 that are arranged in the direction along the axis Ac, the turbine rotor vane rows 43 including the plurality of turbine rotor vanes that are arranged on the outer peripheral surface of the turbine rotor 41 in the circumferential direction around the axis Ac; the plurality of turbine stator vane rows 46 that are arranged in the direction along the axis Ac, the turbine stator vane rows 46 including the plurality of turbine stator vanes that are provided on the inner peripheral surface of the turbine casing 45 to be adjacent to the turbine rotor vanes while being on one side in the direction along the axis Ac and that are arranged in the circumferential direction; and the diffuser 60 in which the exhaust gas flow path E through which an exhaust gas flows from the one side to the other side in the direction along the axis Ac is formed, the diffuser 60 being provided closer to the other side in the direction along the axis Ac than the last stage rotor vane row 43A that is closest to the other side in the direction along the axis Ac among the plurality of turbine rotor vane rows 43. The diffuser 60 includes the inner cylinder 62 that extends along the axis Ac, the outer cylinder 61 that covers the inner cylinder 62 from the outer peripheral side and that forms the exhaust gas flow path E between the inner cylinder 62 and the outer cylinder 61, and the plurality of struts 63 that are provided at intermediate positions in the exhaust gas flow path E, that connect the inner cylinder 62 and the outer cylinder to each other in the radial direction, and that are arranged in the circumferential direction, the outer cylinder 61 includes the first inclined surface 61A that extends from the inner side in the radial direction centered on the axis Ac to become closer to the outer side from an inlet of the exhaust gas flow path E on the one side in the direction along the axis Ac toward the other side, the first inclined surface 61A forms an angle equal to or larger than 16° and equal to or smaller than 24° with respect to the axis Ac in a cross-sectional view including the axis Ac, and the throat width A1 at end portions of the turbine rotor vanes of the last stage rotor vane row 43A that are on the outer side in the radial direction with respect to the axis Ac is set to be larger than the throat width A2 at the intermediate portion 50 in the radial direction.

According to the above-described configuration, the angle formed between the axis Ac and the first inclined surface 61A is equal to or larger than 16° and equal to or smaller than 24° so as to be larger than that in the case of a diffuser in the related art. Accordingly, the flow velocity of an exhaust gas flowing through the exhaust gas flow path E can be further reduced at a region closer to the one side in the direction along the axis Ac than the struts 63. As a result, a pressure loss caused by the struts 63 can be further suppressed. Furthermore, regarding the turbine rotor vanes of the last stage rotor vane row 43A, the throat width A1 at the end portion on the outer side in the radial direction is larger than the throat width A2 at the intermediate portion 50M. Accordingly, the total pressure at the end portion on the outer side in the radial direction is made high. Therefore, it is possible to reduce a probability that a stream is separated at the first inclined surface 61A.

(2) In the turbine 40 according to a second aspect, the throat width A1 at end portions of the turbine rotor vanes of the last stage rotor vane row 43A that are on the inner side in the radial direction is set to be larger than the throat width A2 at the intermediate portion 50M in the radial direction.

According to the above-described configuration, regarding the turbine rotor vanes of the last stage rotor vane row 43A, the throat width A1 at the end portion on the inner side in the radial direction is larger than the throat width A2 at the intermediate portion 50M. Accordingly, the total pressure at the end portion on the inner side in the radial direction is made high. Therefore, it is possible to reduce a probability that a stream is separated at the outer peripheral surface 62A of the inner cylinder 62.

(3) In the turbine 40 according to a third aspect, an area ratio between the flow path cross-sectional area of the diffuser 60 at an edge of the strut 63 that is on the one aide in the direction along the axis Ac and the flow path cross-sectional area of the diffuser 60 at an inlet that is on the one side in the direction along the axis Ac is equal to or larger than 1.28 and equal to or smaller than 1.37.

According to the above-described configuration, the flow velocity of an exhaust gas can be further reduced at a region closer to the one side in the direction along the axis Ac than the struts 63.

(4) In the turbine 40 according to a fourth aspect, the tip side end surfaces 50C of the turbine rotor vanes of the last stage rotor vane row 43A that are on the outer side in the radial direction extend to become closer to the outer side in the radial direction from the one side toward the other side in the direction along the axis Ac as seen in the circumferential direction, and the angle θ1 formed between the axis Ac and the tip side end surfaces 50C is set to be larger than the angle θ2 formed between the axis Ac and the first inclined surface 61A.

According to the above-described configuration, a stream component directed toward the outer side in the radial direction along the tip side end surface 50C is guided by the first inclined surface 61A positioned on the other side in the direction along the axis Ac. Since the angle θ1 formed between the axis Ac and the tip side end surface 50C is larger than the angle θ2 formed between the axis Ac and the first inclined surface 61A, the above-described stream component comes into close contact with the first inclined surface 61A as if the component is pressed against the first inclined surface 61A. As a result, separation of the stream at the first inclined surface 61A can be further suppressed.

(5) In the turbine 40 according to a fifth aspect, the difference between the angle θ1 formed between the axis Ac and the tip side end surfaces 50C and the angle θ2 formed between the axis Ac and the first inclined surface 61A is equal to or larger than 0° and equal to or smaller than 5°.

According to the above-described configuration, the separation of the stream at the first inclined surface 61A can be further suppressed.

(6) In the turbine 40 according to a sixth aspect, the outer cylinder 61 further includes the second inclined surface 61B that is connected to the other side of the first inclined surface 61A in the direction along the axis Ac and that extends from the inner side in the radial direction to become closer to the outer side from the one side toward the other side in the direction along the axis Ac, an angle formed between the axis Ac and the second inclined surface 61B in a cross-sectional view including the axis Ac is smaller than the angle θ2 formed between the axis Ac and the first inclined surface 61A, and the struts 63 are disposed over the first inclined surface 61A and the second inclined surface 61B in the direction along the axis Ac.

According to the above-described configuration, the struts 63 are disposed over the first inclined surface 61A and the second inclined surface 61B. Accordingly, the exhaust gas stream is sufficiently decelerated in a region on the first inclined surface 61A side before coming into contact with the struts 63. As a result, the pressure loss caused by the struts 63 can be further reduced.

(7) The gas turbine 10 according to a seventh aspect, includes the compressor 20 that generates high-pressure air obtained through compression of the air A, the combustor 30 that generates the combustion gas G by mixing fuel with the high-pressure air, and the turbine 40 being driven by means of the combustion gas G.

According to the above configuration, it is possible to provide the gas turbine 10 in which pressure loss in the diffuser 60 is further reduced so that the performance of the gas turbine 10 is further improved.

INDUSTRIAL APPLICABILITY

According to the present disclosure, it is possible to provide a turbine and a gas turbine with further improved performance attributable to reduction in pressure loss.

REFERENCE SIGNS LIST

- 10: gas turbine
- 11: gas turbine rotor
- 15: gas turbine casing
- 16: intermediate casing
- 20: compressor
- 21: compressor rotor
- 22: compressor rotary shaft
- 23: compressor rotor vane row
- 25: compressor casing
- 26: compressor stator vane row
- 30: combustor
- 40: turbine
- 41: turbine rotor
- 42: turbine rotary shaft
- 43: turbine rotor vane row
- 43A: last stage rotor vane row
- 45: turbine casing
- 45A: inner peripheral surface
- 44: turbine stator vane row
- 50: last stage rotor vane row
- 50A: leading edge
- 50B: trailing edge
- 50C: tip side end surface
- 50G: hub side end surface
- 50H: rotor vane body
- 50M: intermediate portion
- 50N: suction surface
- 50P: pressure surface
- 60: diffuser
- 61: outer cylinder
- 61A: first inclined surface
- 61B: second inclined surface
- 62: inner cylinder
- 62A: outer peripheral surface
- 63: strut
- 63A: strut leading edge
- 63B: strut trailing edge
- 64: manhole
- 70: disk
- 70A: outer peripheral surface
- 80: bearing device
- Ac: axis
- A: air
- E: exhaust gas flow path
- F: fuel
- G: combustion gas
- $\theta 1, \theta 2$: angle
- $\theta 3, \theta 4$: outflow angle

The invention claimed is:

1. A gas turbine comprising:
a turbine rotor that extends along an axis and is rotatable around the axis;
a turbine including turbine stator vane rows and turbine rotor vane rows provided alternately in one row in a direction of the axis; and
a diffuser which is downstream of a last stage rotor vane row among the turbine rotor vane rows in a flow direction of a combustion gas along with the axis, the diffuser defining an exhaust gas flow path for an exhaust gas to flow through from an inlet toward an outlet,
wherein the diffuser includes:
an inner cylinder;
an outer cylinder that covers the inner cylinder from an outer peripheral side and defines the exhaust gas flow path between the inner cylinder and the outer cylinder; and
struts that are provided at intermediate positions in the exhaust gas flow path, arranged in a circumferential direction with respect to the axis, and connect the inner cylinder and the outer cylinder to each other in a radial direction,
wherein:
the outer cylinder includes an inclined surface that extends from an inner side in the radial direction centered on the axis toward an outer side from an inlet side of the exhaust gas flow path in the direction of the axis toward an outlet side of the exhaust gas flow path in the direction of the axis;
the inclined surface defines an angle equal to or larger than 16° and equal to or smaller than 24° with respect to the axis in a cross-sectional view including the axis;
a throat width at end portions of turbine rotor vanes constituting the last stage rotor vane row that are on the outer side in the radial direction with respect to the axis is larger than a throat width at an intermediate portion in the radial direction; and
in each of the turbine rotor vanes constituting the last stage rotor vane row, tip side end surfaces on the outer side in the radial direction extend toward the outer side in the radial direction as the tip side end surfaces extend from an upstream side of a combustion gas flow path to a downstream side of the combustion gas flow path, and angles of the tip side end surfaces with respect to the axis are larger than an angle of the inclined surface with respect to the axis.

2. The gas turbine according to claim 1,
wherein a throat width at end portions of the turbine rotor vanes constituting the last stage rotor vane row that are on the inner side in the radial direction with respect to the axis is larger than the throat width at the intermediate portion in the radial direction.

3. The gas turbine according to claim 1,
wherein an area ratio S2/S1 between a flow path cross-sectional area S2 of the diffuser at a front edge of the strut on the inlet side in the direction along the axis and a flow path cross-sectional area S1 of the diffuser at the inlet of the diffuser is equal to or larger than 1.28 and equal to or smaller than 1.37.

4. The gas turbine according to claim 1,
wherein a difference between an angle defined between the axis and the tip side end surfaces and the angle defined between the axis and the inclined surface is equal to or larger than 0° and equal to or smaller than 5°.

5. The gas turbine according to claim 1, wherein:
the inclined surface is a first inclined surface;
the outer cylinder further includes a second inclined surface that is connected to the outlet side of the first inclined surface in the direction along the axis and extends from the inner side in the radial direction toward the outer side from the inlet side toward the outlet side in the direction along the axis;
an angle defined between the axis and the second inclined surface in the cross-sectional view including the axis is smaller than the angle defined between the axis and the first inclined surface; and
the struts are disposed over the first inclined surface and the second inclined surface in the direction along the axis.

6. The gas turbine according to claim 1,
wherein, in each of the turbine rotor vanes constituting the last stage rotor vane row, angles of the tip side end surfaces with respect to the axis are 20° or more and 25° or less.

7. The gas turbine according to claim 1, further comprising:
a compressor configured to generate high-pressure air through compression of air; and
a combustor configured to generate a combustion gas by mixing fuel with the high-pressure air.

8. A turbine comprising:
a turbine rotor that extends along an axis and is rotatable around the axis; and
turbine stator vane rows and turbine rotor vane rows provided alternately in one row in a direction of the axis,
wherein:
a throat width at end portions of turbine rotor vanes constituting a last stage rotor vane row that are on an outer side in a radial direction with respect to the axis is larger than a throat width at an intermediate portion in the radial direction, the last stage rotor vane row being positioned furthest downstream in a flow direction of a combustion gas along with the axis among the turbine rotor vane rows; and
in each of the turbine rotor vanes constituting the last stage rotor vane row, tip side end surfaces on the outer side in the radial direction extend toward the outer side in the radial direction as the tip side end surfaces extend from an upstream side of a combustion gas flow path to a downstream side of the combustion gas flow path, and angles of the tip side end surfaces with respect to the axis are 20° or more and 25° or less.

9. The turbine according to claim 8,
wherein a throat width at end portions of the turbine rotor vanes constituting the last stage rotor vane row that are on the inner side in the radial direction with respect to the axis is larger than the throat width at the intermediate portion in the radial direction.

10. A gas turbine comprising:
a compressor configured to generate high-pressure air through compression of air;
a combustor configured to generate a combustion gas by mixing fuel with the high-pressure air; and
the turbine according to claim 8.

* * * * *